United States Patent [19]
Jones

[11] 4,005,909
[45] Feb. 1, 1977

[54] DC LEVEL DETECTOR AND ZERO VELOCITY GATE CIRCUIT FOR USE IN A VEHICLE SKID CONTROL BRAKING SYSTEM

[75] Inventor: James J. Jones, Plane, Tex.

[73] Assignee: Texas Instruments Incorporated, Dallas, Tex.

[22] Filed: July 3, 1972

[21] Appl. No.: 268,398

[52] U.S. Cl. .................................. 303/91; 303/20; 303/106

[51] Int. Cl.² ........................................ B60T 8/08

[58] Field of Search .......... 188/181 A; 303/20, 21, 303/91, 105, 106; 324/162; 340/52 B, 262, 53, 62; 307/10 R; 317/5

[56] References Cited

UNITED STATES PATENTS

| 3,499,689 | 3/1970 | Carp et al. ..................... 303/20 X |
| 3,578,819 | 5/1971 | Atkins ............................ 303/21 P |
| 3,606,490 | 9/1971 | Ando .............................. 303/20 X |
| 3,608,979 | 9/1971 | Coyle ............................ 303/21 EB |
| 3,620,577 | 11/1971 | Neisch et al. ................. 303/21 EB |
| 3,690,735 | 9/1972 | Arai et al. ...................... 303/20 X |

*Primary Examiner*—Stephen G. Kunin
*Attorney, Agent, or Firm*—Harold Levine; James T. Comfort; William E. Hiller

[57] ABSTRACT

Provided is a DC level detector and zero velocity gate circuit utilized in a vehicle skid control braking system. The circuit includes a first signal generator for generating a plurality of DC signals when the DC voltage level of a varying DC signal coupled to the circuit reaches a selected value, i.e., a DC voltage level representative of a substantially zero frequency condition. The varying DC signal is preferably proportional to the wheel speed of a moving vehicle. The circuit also includes a second signal generator for generating a gate signal indicating when the DC level reaches a selected level which indicates a zero velocity wheel speed. The first signal generator generates first and second signals which are differentiated by third and fourth signal generators indicating vehicle deceleration and vehicle acceleration in the vehicle skid control braking system. The circuit advantageously eliminates any undesirable ripple characteristics of the varying DC signal, preventing such ripple characteristics from being coupled to other voltage responsive circuits in, for example, a vehicle skid control braking system.

8 Claims, 7 Drawing Figures

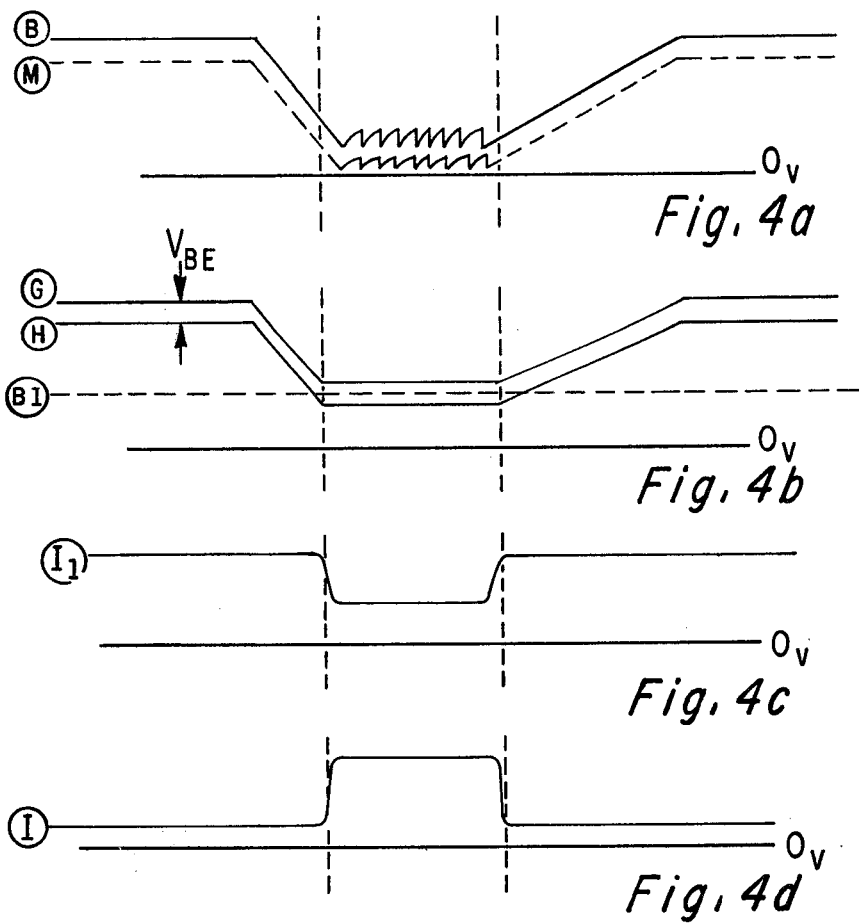

DC LEVEL DETECTOR AND ZERO VELOCITY GATE CIRCUIT FOR USE IN A VEHICLE SKID CONTROL BRAKING SYSTEM

BACKGROUND INFORMATION

This invention relates to a vehicle skid control system, and more particularly to a "pumping-type" or "pulse action" vehicle brake control system that advantageously utilizes in combination: (1) Speed Sensor means; (2) Frequency Convertor means; (3) Slip and Ramp Signal Generator and Comparator Circuit means; (4) D.C. Level Detector and Zero Velocity Gate circuit means; (5) Acceleration and Deceleration Differentiator circuit means; (6) Variable Threshold Acceleration and Deceleration Gate Circuit means; (7) Acceleration Programmed Oscillator circuit means; (8) Fixed Threshold Variable Duty Cycle Pulse Generator circuit means; (9) Reset Timer and Gate Circuit means; (10) Brake Control Logic circuit means; and (11) Failsafe Monitoring and Indicating means.

When the operator of a land vehicle desires to stop his vehicle under emergency braking conditions or under adverse road conditions, a realistic probability exists that the land vehicle will undergo an uncontrolled skid, or a controllable skid which prevents the operator from bringing his land vehicle to a safe stop within the distance available. Under these circumstances, one factor that indicates an imminent skid is the relative relationship between vehicle wheel speed and vehicle speed. It has been readily accepted by safety experts and prefessional land vehicle drivers that vehicle stability can be achieved by automatically "pumping" or "pulsing" of the brakes associated with the wheels of the land vehicle in a pre-programmed manner dynamically related to the rate of acceleration and deceleration of the land vehicle.

In more recent times, several systems have been developed that operate on the principle of selectively inhibiting the normal braking action initiated by the operator of the land vehicle. In one of these systems, wheel speed sensors are utilized to generate A.C. signals that are proportional to vehicle wheel speed. The vehicle wheel speed signals are then processed through a control module which generates a D.C. voltage to energize a solenoid in an actuator that controls the hydraulic braking system to the vehicle wheels. When a skid is imminent, a command signal from the control module causes the actuator solenoid to close a vacuum passaage in a diaphragm chamber. By action of the diaphragm and the normal hydraulic pressure from the master cylinder of the land vehicle braking system as developed by the operator thereof, the hydraulic pressure to the vehicle wheels is released, thereby inhibiting the vehicle wheel braking action. When the vehicle wheels spin up to the vehicle speed or to a selective lower speed, the control module produces a signal to deenergize the actuator solenoid. This in turn restores line pressure in the vehicle braking system and reapplies the vehicle brakes In effect, what is achieved by this system is that the vehicles brakes are "pumped" or "pulsed" in a manner often recommended for controlled braking under adverse driving conditions.

The control module of the aforementioned system includes a frequency convertor for each wheel speed sensor for converting a frequency varying signal into a varying direct current signal proportional thereto. A summation of the outputs from each of the frequency convertors produces a composite of the vehicle wheel speed signals. Respective deceleration and acceleration rate detectors respond to the output of the summing amplifier for producing outputs proportional to the rate of deceleration and acceleration respectively of the wheels of the land vehicle. A signal proportional to the output of the summing amplifier is transferred to a vehicle velocity ramp generator and one input of an automatically adjustable switching circuit. The vehicle velocity ramp generator produces a step function ramp signal having an overall slope related to the actual speed of the land vehicle when braking to a stop. The automatically adjustable switching circuit also receives an input from the vehicle velocity ramp generator and an input from a retarding force detector, and produces an output whenever the summation of the wheel speed signal, the velocity ramp signal, and the retarding force signal reaches a first threshold condition. The retarding force detector produces an output signal which relates to the braking factors including tire condition, brake condition, and the condition of the road surface. To generate a control signal to the actuator solenoid, the output of the deceleration rate detector, the acceleration rate detector, and the automatically adjustable switching circuit must have a certain designated relationship. These three signals are the inputs to the brake controller as the last component in the control module.

A more detailed description of the features briefly stated above with regard to a prior known vehicle skid control system is set forth in a copending patent application, Ser. No. 25,131, filed Apr. 2, 1970, for "Vehicle SKID CONTROL SYSTEM," which is assigned to the assignee of this application.

Another known and similar system that operates on the principle of inhibiting the normal braking action initiated by the operator of the land vehicle is set forth in U.S. Pat. No. 3,578,819, issued May 18, 1971, for "SKID CONTROL SYSTEM," in the name of Thomas M. Atkins.

OBJECTIVES OF THE INVENTION

An object of the present invention is to provide a DC Level Detector circuit which selectively provides as an output signal a pulsed DC signal indicating that the DC level of the input signal has reached a preselected value.

Another object of this invention is to provide in a Vehicle Skid Control Braking system a DC Voltage Level Detector Circuit which generates DC output signals when the frequency of varying input signal indicative of vehicle wheel speed is below a predetermined value.

It is yet another object of the present invention to provide in a Vehicle Skid Control Braking system a DC voltage level detector circuit which generates a pulsed DC gating signal when a varying DC input signal indicative of vehicle wheel speed reaches a selected DC voltage level.

It is still a further object of the present invention to provide a DC Voltage Level Detector circuit which filters any undesirable ripple characteristics of a varying input DC level signal which is transmitted to other voltage responsive circuits.

It is still another object of the present invention to provide in a Vehicle Skid Control Braking System a Dc voltage level detector circuit which generates first and second varying DC voltage signal responsive to an input signal indicative of wheel speed which are differentiated to indicate acceleration and deceleration of the wheels of the vehicle.

It is still another object of the present invention to provide in a Vehicle Skid Control Braking System of the type that selectively controls the engagement and disengagement of the braking system of a vehicle in accordance with selected braking conditions, a DC level detector and zero velocity gate circuit comprising first signal means responsive to a first signal representing the wheel speed of the vehicle for generating proportional second and third signals, second signal means for generating a gate signal when the first signal reaches a selected value and third and fourth signal means responsive to the second signal for generating signals representing deceleration and acceleration conditions of the wheels of the vehicle.

BRIEF DESCRIPTION OF THE DRAWINGS

FIGS. 4a–4d graphically represents an exemplary input waveform to the DC Voltage Level Detector circuit and the output waveforms produced as a result thereof.

BRIEF DESCRIPTION OF THE INVENTION

Figure 1:
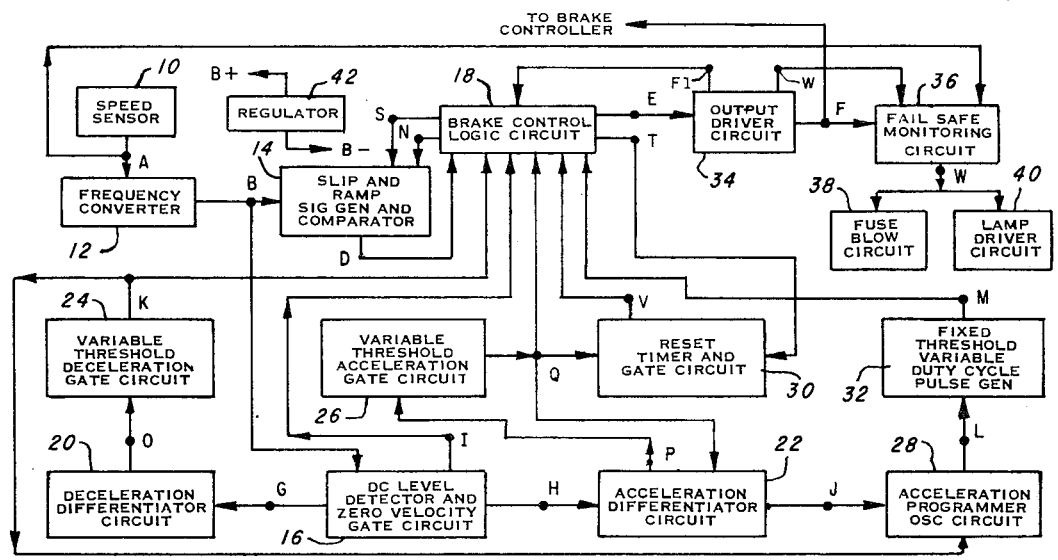
FIG. 1 is a block diagram of one embodiment of an improved Vehicle Skid Control Module for a Vehicle Skid Control Braking system.

An improved Vehicle Skid Control System in which this invention is advantageously utilized includes a wheel sensor, which may be coupled to the wheels or to the drive shaft of the land vehicle, generates AC signals having a frequency varying in accordance with vehicle wheel speed A. These frequency varying signals A are coupled to a Frequency Convertor that produces a DC output signal having a voltage magnitude that varies proportionally with the frequency of the AC signals generated by the speed sensor B. The varying DC wheel speed signals B generated by the frequency convertor are coupled to a Slip and Ramp Signal Generator and Comparator and to a DC Level Detector and Zero Velocity Gate Circuit.

The Slip and Ramp Signal Generator and Comparator performs three basic functions: First, it modifies or offsets the varying DC wheel speed signals B coupled thereto by a predetermined percentage or value, which is referred to as the "slip" signal $C_1$; second, under the control of the slip signal $C_1$, it generates a ramp signal C having a programmable constant current rate of discharge; and third, it compares the ramp signal C and the varying DC signal B, and when vehicle wheel speed drops below the rate of discharge of the ramp signal, it generates a "slip" gate signal D. The slip gate signal D is then coupled to one of the inputs of a Brake Control Logic circuit.

The DC Level Detector and Zero Velocity Gate circuit of this invention performs three basic functions. First, it generates two DC level signals (G and H) when the frequency of the AC signal A is zero or below a preset value with respect to vehicle wheel speed; second, it generates a zero velocity gate signal (I) when the DC level signal B reaches a selected DC Level; and third, it prevents any ripple characteristics of the varying DC signal B coupled thereto, which frequently occur when the land vehicle is operated at low speeds, from being coupled into a Deceleration Differentiator circuit and to an Acceleration Differentiator circuit. The two DC level signals are coupled respectively to the Deceleration and Acceleration Differentiator circuits, while the zero velocity gate signal I is coupled to the Brake Control Logic circuit.

The Deceleration Differentiator circuit differentiates the DC level signal G coupled thereto, and couples a deceleration differentiator signal (0) to a Variable Threshold Deceleration Gate circuit, which in turn generates a deceleration gate signal (K) when the rate of deceleration of the vehicle wheels exceeds a preset value.

The Variable Threshold Deceleration Gate circuit has a variable threshold feature which produces an output gate signal having a "turn on" threshold at a different level than its "turn off" threshold. That is to say, the Variable Threshold Deceleration Gate circuit "turns on" at a lower threshold than it "turns off" so as to provide a desirable fast "turn off" relative to the rate of deceleration of the vehicle wheels. The Variable Threshold Deceleration Gate circuit output gate signal is then coupled to the Brake Control Logic circuit.

The Acceleration Diffentiator circuit is similar to the Deceleration Differentiator circuit but for the fact that it operates in response to the rate of acceleration of the vehicle wheels. This circuit differentiates the DC Level signal H coupled thereto and couples a first acceleration differentiator signal (J) to an Acceleration Programmed Oscillator circuit, and couples a second acceleration differentiator signal (P) to a Variable Threshold Acceleration Gate circuit.

The Variable Threshold Acceleration gate circuit is also similar to the Variable Threshold Deceleration Gate circuit but for the fact that it is responsive to the rate of acceleration of the vehicle wheels. This circuit also has a variable threshold feature wherein the "turn on" threshold of the circuit is at a lower value than the "turn off" threshold of the circuit. The acceleration gate signal (Q) is coupled to the Brake Control Logic circuit and to a Reset Timer and Gate circuit.

The Acceleration Programmed Oscillator circuit in response to the acceleration differentiator signal J produces an acceleration oscillator signal (L) that has a frequency proportional to the rate of acceleration of the vehicle wheels. This acceleration oscillator signal J is then coupled to a Fixed Threshold Variable Duty Cycle Pulse Generator.

The Fixed Threshold Variable Duty Cycle Pulse Generator cam be programmed from zero percent to 100 percent duty cycle with respect to the output signal. This circuit produces a duty cycle gate signal (M) and couples this duty cycle gate signal M to the Brake Control Logic Circuit.

The Reset Timer and Gate circuit receives input signals from both the Brake Control Logic circuit (T) and from the Variable Threshold Acceleration Gate circuit (Q) and commences a reset timing cycle at the end of the reset time period which develops a reset gate signal (V) for selectively coupling the acceleration gate signal Q to the Brake Control Logic circuit.

Fundamentally, the Slip and Ramp Signal Generator and Comparator develops a "slip" signal D, which is a "turn on" gate signal for controlling the brake system of the land vehicle in dynamic proportion to the conditions developed by the Zero Velocity Gate circuit, and the Variable Threshold Acceleration and Deceleration Gate circuits. On the other hand, the brake system of the land vehicle is also controlled by the Reset Gate circuit. Thus, the brake system of the land vehicle is controlled, i.e., "turned on" or "turned off", dependent relative upon wheel speed acceleration rates and wheel velocity levels.

The Brake Control Logic circuit in response to the presence of the several input gate signals applied thereto (i.e., slip gate D, zero velocity gate I, decel gate K, duty cycle gate M, accel gate Q and reset gate V) develops output signals (E, N, S, and T) which are respectively applied to the Output Driver circuit, to "turn on" or "turn off" the brake system of the land vehicle; to the Slip and Ramp Signal Generator, to set the slip and ramp signal generator and comparator and produce the slip gate signal P; and to the Reset Timer and Gate circuit; to reset the skid control module for the succeeding cycle of operation.

The variable AC output signal A generated by the Speed Sensor is also coupled to a Failsafe Monitoring circuit wherein various module, vehicle and vehicle braking conditions are monitored for the purpose of either developing a visual or audible malfunction indication or for blowing a fuse or actuating a circuit breaker as a result of module malfunction, or both. The visual or audible indication feature is for alerting the operator of the land vehicle that a module malfunction exists, while the fusing or circuit braking feature is to remove power from the module and prevent damage thereto. The Failsafe Monitoring circuit may observe many selected characteristics both internal or external to the module. For example, it may detect overcurrent conditions (Failsafe I) of the module and provide a visual or audible indication for the operator and also remove power from the module because this condition means that the land vehicle braking system is malfunctioning in a manner that can damage the module. The Failsafe Monitoring circuit may also generate a visual or audible indication when power to the module is cut-off" (Failsafe II) but will not fuse or circuit break since this condition cannot damage the module. The Failsafe Monitoring circuit may also generate a visual or audible indication but not remove power from the module when the Speed Sensor line is open (Failsafe III) because this condition merely indicates tht the skid control module is malfunctioning in a manner that will not damage the module. A visual or audible indication may be generated by the Failsafe Monitoring circuit when the brake system solenoid is "open" (Failsafe IV) but not fuse or break power since this condition will not damage the module.

Also, the Failsafe Monitoring circuit may generate visual and audible indications for the operator and remove power from the module when it senses a shorted output condition so as to protect the module from "burning out". Monitoring the vehicles braking light switch determines false cycling conditions, when, for example, the operator is not applying the vehicle braking system. False cycling signals may be accumulated over a given finite period of time whereupon both an operator indication and power removing may occur to both indicate a module malfunction and protect the module from further damage. Other fail-safe monitoring conditions can be incorporated into the module of this invention without departing from spirit of this invention.

A more detailed description of the above described improved Vehicle Skid Control system is set forth in copending patent application, Ser. No. 266,798 filed June 27, 1972.

A more complete understanding of the invention and its advantages will be apparent from the specification and claims and from the accompanying drawings illustrative of the invention.

Detailed description of prefered embodiments of this invention follows with reference being made to the drawings wherein like parts and elements have been given like reference numerals for clarity and understanding of the novel, useful and unobvious features of this invention.

DETAILED DESCRIPTION — FIG. 1

Referring to the drawings, in FIG. 1 there is illustrated in block diagram format the components of one embodiment of a control module in a vehicle skid control braking system including a Speed Sensor 10 and a Frequency Convertor 12. The Speed Sensor 10 is coupled to either the wheels or to the drive shaft of a land vehicle, e.g., electromagnetically, optically or mechanically, and generates a varying AC signal (A) which has frequency variations proportional to wheel speed. That is to say, the faster the wheel speed, the higher the frequency of the signal A connected to the Frequency Convertor 12. The variable AC signals A generated by the Speed Sensor 10 are coupled to the Frequency Convertor 12 wherein they are converted to a varying DC signal (B) having a DC magnitude proportional to vehicle wheel speed. The varying DC signal B generated by the Frequency Convertor 12 is coupled to both the Slip and Ramp signal Generator and Comparator 14 and the DC Level Detector and Zero Velocity Gate circuit 16.

The Slip and Ramp Signal Generator and Comparator 14 modifies or offsets the varying DC signal B a preselected value and produces a "slip" signal ($C_1$), and then under the control of the slip signal $C_1$, it develops a ramp signal (C) having a dynamically programmable constant current rate of discharge. The ramp signal C is then compared with the varying DC signal B, and when the wheel speed of the land vehicle drops below the related vehicle speed represented by the ramp signal C, a "slip" gate signal (D) is generated. The slip gate signal D is then coupled to one of the inputs of the Brake Control Logic circuit 18.

The DC Level Detector and Zero Velocity Gate circuit 16, in response to the variable DC signal B generated by the Frequency Convertor 12, generates two output signals (G and H), each signal being clamped at a selected DC level of the input signal applied thereto, with such signals being respectively coupled to the Deceleration Differentiator circuit 20 and the Acceleration Differentiator circuit 22. Basically, the reason for detecting the preselected DC levels of the input signal B and developing output signals G and H, is to prevent any ripple characteristics of the signal applied thereto, which frequently occurs when the land vehicle is operated at low speeds, from being coupled into the Deceleration and Acceleration Differentiator circuits 20, 22. The DC Level Detector and Zero Velocity Gate circuit 16 develops a zero velocity gate signal (I) and couples this signal I to one input of the Brake Control Logic circuit 18.

The Deceleration Differentiator 20 differentiates the variable DC signal G applied thereto and generates a pulse output signal (O) which signal O is coupled to the Variable Threshold Deceleration Gate circuit 24; while the Acceleration Differentiator 22 differentiates the variable DC signal H applied thereto and generates a pulse output signal (P) which signal P is coupled to the Variable Threshold Acceleration Gate circuit 26.

The Variable Threshold Deceleration Gate circuit 24 has a variable threshold feature which produces an output gate signal (K) having a "turn on" threshold at a different level then its "turn off" threshold. That is to say, the Variable Threshold Deceleration Gate circuit 24 "turns on" at a lower threshold than it "turns off" of the vehicle braking application so as to provide a desirable fast "turn off" relative to the rate of deceleration of the wheels of the land vehicle. The pulse output signal K developed by the Variable Threshold Deceleration Gate circuit 24 is present when the deceleration rate of change of the vehicle wheels exceeds a preset value and is coupled to one of the inputs of the Brake Control Logic circuit 18 and to the Acceleration Programmed Oscillator circuit 28.

The Variable Threshold Acceleration Gate circuit 26 is similar to the Variable Threshold Deceleration Gate circuit 24 but for the fact that it is responsive to the pulse output signal P developed by the Acceleration Differentiator 22, and generates a pulse output signal (Q) indicative of the acceleration of the vehicle wheel speed above a preselected value. The circuit also has a variable threshold feature in which the "turn of" of the circuit is at a lower threshold than the "turn off" feature of the circuit. The pulse output signal Q of the Variable Threshold Acceleration Gate circuit 26 is coupled to one of the inputs of the Brake Control Logic 18, the Acceleration Differentiator circuit 22 and the Reset Timer and Gate circuit 28.

The Acceleration Programmed Oscillator circuit 28 receives an analog signal (J) from the Acceleration Differentiator 22 which programs the oscillator so as to produce a sawtooth pulse output signal (L) that has a frequency proportional to the rate of acceleration of the vehicle wheels. This output sawtooth signal L is coupled to a Fixed Threshold Variable Duty Cycle Pulse Generator 32.

The Fixed Threshold Variable Duty Cycle Pulse Generator 32 is programmable from zero percent to 100 percent duty cycle with respect to the output signal developed thereby M. The output signal M of the Fixed Threshold Variable Duty Cycle Pulse Generator 32 is coupled to one of the inputs of the Brake Control Logic circuit 18.

The Reset Timer and Gate circuit 30 is reset by one of the outputs of the brake control logic circuit 18 (T) and commences a reset timing cycle at the end of the reset time period which develops a reset gate signal (V) for controlling the application of the output pulse signal Q generated by the Variable Threshold Acceleration Gate circuit 26 (Q) and selectively couples this output pulse signal Q to one of the inputs of the Brake Control Logic circuit 18.

In addition to the pulse output signal T, the Brake Control Logic circuit 18 also develops an output pulse (E) and couples the pulse signal E to the Output Driver circuit 34, which in turn develops output pulse signals (F and W). The output pulse signal F is coupled to the Brake Controller (not shown) of the land vehicle braking system and to the Failsafe Monitoring circuit 36.

The output pulse signal W is coupled to the Failsafe Monitoring circuit 36. The output pulse signal F1 applied to the Brake Control Logic circuit 18 sets the logic circuit in condition for a subsequent brake control cycle of operation.

The Failsafe Monitoring circuit 36 also receives the variable AC signal A from the Speed Sensor 10, and along with the output pulse signals F and W, monitors module system operation and develops signals swhich either drive an indicator, such as a lamp or buzzer, or disconnect power to the module, i.e., blow a fuse or open a circuit breaker, or both, for visual or audible indication of module or braking system malfunction, or for disconnecting power from the module to prevent further damage, or both. The Failsafe Monitoring circuit 36 respectively couples control signals to the Fuse Blow circuit 38 and/or the Lamp Driver circuit 40.

DETAILED DESCRIPTION — FIG. 2

Figure 2:
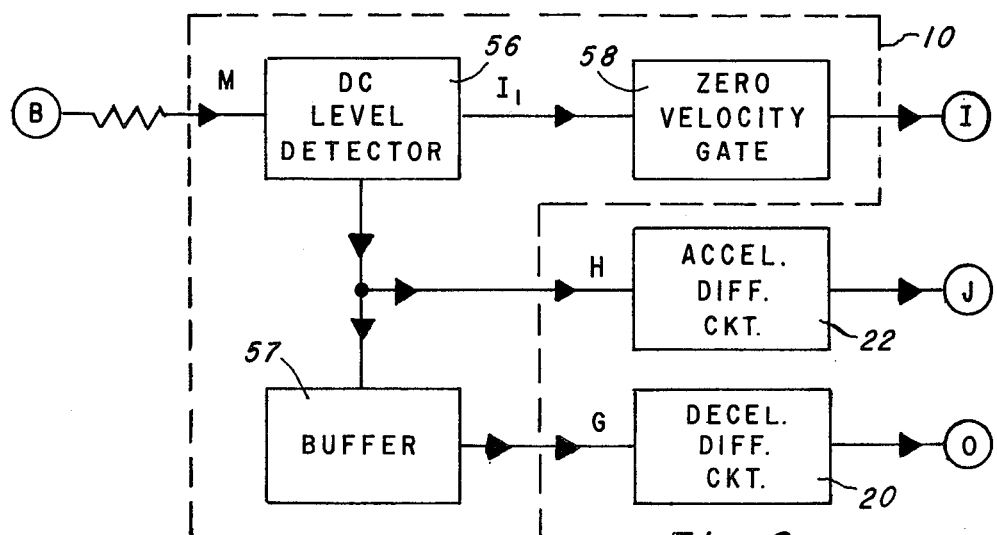
FIG. 2 is a block diagram of a DC Voltage Level Detector circuit and Zero Velocity Gate circuit coupled to differentiator circuits utilized in the Skid Control Module of FIG. 1.

Referring now to FIG. 2, there is depicted in block diagram form the functional components of the DC Level Detector and Zero Velocity Gate circuit disclosed in this application. The circuit function embodied in FIG. 2 is particularly advantageous when utilized in a Vehicle Skid Control Braking system. In such a braking system a varying DC signal B indicative of wheel speed is coupled to the DC Level Detector circuit 56. Signal B is typically reduced in magnitude by a coupling resistor to provie a signal input M. The detector 56 generates a first varying DC signal H which is dependent upon the frequency of the input signal M and accordingly dependent upon wheel velocity. Output signal H is preferably coupled to an Acceleration Differentiator circuit (22) in the Skid Control system above. Signal H also is preferably coupled to a Deceleration Differentiator circuit (20) through a buffer circuit 57. Buffer 57 provides an output signal G from signal H having less distortions and lower output impedance Signals H and G indicative of wheel velocity are respectively transforemd into signals J and O by the differentiator circuits 22 and 20, respectively, to indicate wheel acceleration and deceleration in the Skid Control Braking system.

In addition to the varying DC signal H, the detector 56 also generates a third output signal $I_1$ which is coupled to the Zero Velocity Gate circuit 58. The gate circuit 58 provides an output signal I from input signal $I_1$ which has a less distorted waveform and an increased amplitude. Preferably, signal I is coupled to an input of the Brake Control Logic circuit as earlier described in the Skid Control System to indicate vehicular zero velocity.

Varying DC input signal B may have an undesired ripple characteristic in its slow speed waveform, when it is below a preselected DC level, which ripple is advantageously eliminated by detector 56 prior to its being coupled to the Differentiator and Brake Control Logic circuits.

Figure 3:
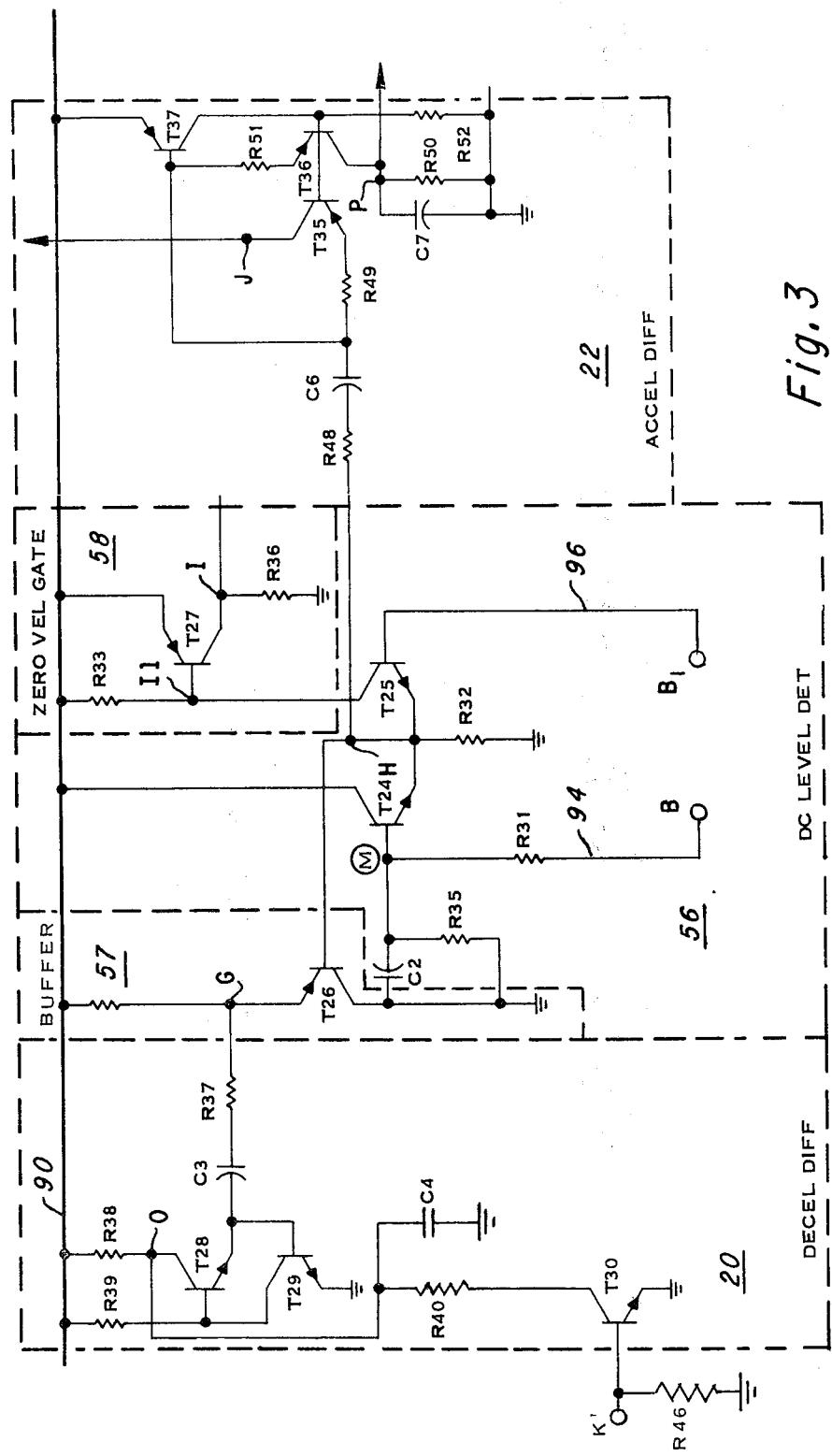
FIG. 3 represents a circuit schematic of the DC Voltage Level Detector and Zero velocity Gating circuit and differentiator circuits depicted in block form in FIG. 2.

Shown in FIG. 3 is a detailed schematic diagram of one embodiment of the DC Level Detector 56, Zero Velocity Gate 58, buffer 57 of FIG. 2 and differentiator circuits 20 and 22. A positive DC regulated voltage V provides the power to energize the components of the circuits 56, 57, 58, 20 and 22. Preferably, source V is approximately +8 volts.

The DC level detector 56 comprises a differential amplifier having transistors T24 and T25. The differential amplifier transistor T24 has its collector connected to the V source line 90, while the differential amplifier transistor T25 is connected to the source line 90 via the collector bias resistor R33. The differential amplifier transistors have their emitters connected in common to ground via the emitter bias resistor R32, and their bases respectively coupled to line 94 and 96, to form a through limiting resistor R31.

The buffer circuit 57 comprises output transistor T26 having it emitter connected to the V source line 90 via the emitter bias resistor R34. Its collector is connected to ground, and it s base is connected to the emitters of the differential amplifier transistors T24 and T25. Capacitor C2 of the detector circuit 56 is connected between the collector of the output transistor T26 and the base of the differential transistor T24, with the junctions thereof being coupled to ground through bias resistor R35. This capacitor C2-resistor R35 circuit prevents any AC components that may be developed by the differential amplifier transistors T24 and T25 from being coupled to the output transistor T26. Output buffer transistor T26 is coupled in an emitter follower configuration so that no gain is achieved in the generation of the DC level signal G, which may advantageously be coupled to a Deceleration Differential Circuit.

The zero velocity gate circuit 58 includes an output transistor T27 having its emitter connected to the V source line 90, its base connected to the V source line 90 via bias base resistor R33 and its collector connected to ground via its load resistor R36. The zero veocity gate output signal I is developed across the load resistor R36 and may then be preferably coupled to a Brake Control Logic circuit as shown in FIg. 1.

Deceleration differentiator circuit 20 and acceleration differentiator circuit 22 may be any of the well-known differentiator circuits in the art which utilizes an RC circuit to provide the mathematical derivative of an incoming signal; that is, to provide the amplitude rate of change of the incoming signal. Circuit 20 is responsive to a decreasing rate of change (negative rate) and circuit 22 is responsive to an increasing rate of change (positive rate). A more detailed explanation of the circuits 20 and 22 illustrated in FIG. 3 will be found in the *Acceleration and Deceleration Differentiator Circuits* patent application hereafter referenced.

Output signal G from buffer 57 is differentiated by circuit 20 to provide output signal 0 which is representative of vehicle deceleration in the Skid Control Braking System above described. Output signal H from the DC Level Detector Circuit 56 is differentiated by circuit 22 to provide output signal J which is representative of vehicle acceleration in the preferred Skid Control Braking System above.

FIG. 5 4a–4d show exemplary waveforms generated during the preferred mode of operation of the circuit of FIG. 3. A portion of varying DC input signal B is shown in FIG. 4A. Input signal M generated by input signal B is shown having the amplitude of signal B reduced due to limiting resistor R31.

FIG. 4B shows the other input B1 to the differential pair which value is sufficiently low to bias transistor T25 into the non-conducting state when transistor T24 is conducting. When input signal M to transistor L24 is sufficiently low in voltage, as shown as the negative going pulse between the dotted lines, which causes transistor T24 to become non-conducting the voltage on the common emitters is reduced toward zero volts, providing output signal H as shown. Signal H is thereafter differentiated by circuit 22 to provide an analog representation of vehicle acceleration in the Vehicle Skid Control Braking System of FIG. 1. Signal H is also coupled to output transistor T26 which provides output signal G of amplitude $V_{be}$ greater than signal H. Signal G is subsequently differentiated by circuit 20 to provide an analog representation of vehicle deceleration.

When tranistor T24 becomes non-conducting, and the voltage on the common emitters of transistors T24 and T25 is reduced, input voltage B1 is sufficient to cause transistor T25 to become conductive providing waveform 11 in FIG. 4C. Signal I1 is coupled to the base of output transistor T27 in the Zero Velocity Gate circuit which provides an inverted and amplified output signal I as shown in FIG. 4D. As indicated above, output signals G, H and I may advantageously be coupled, respectively, to a Deceleration Differentiator Circuit, an Acceleration Differentiator Circuit, and a Brake Control Logic Circuit in the Vehicle Skid control Braking System depicted in FIG. 1.

Although specific embodiments of this invention have been described herein in conjunction with a DC Voltage Level Detector and Zero Speed Gating Circuit utilized in a Vehicle Skid control Braking System, various circuit modifications will be apparent to those skilled in the art in providing the means herein described without departing from the scope of the invention.

What is claimed is:

1. In a vehicle skid control braking system of the type that selectively controls the engagement and disengagement of the braking system of a vehicle in accordance with selected braking conditions, a DC level detector and zero velocity gate circuit comprising in combination:

first signal means responsive to a first signal in the form of a varying DC signal representing the wheel speed of the vehicle for generating second and third signals proportional to said first signal, said first signal means including detector means for eliminating undesirable ripple characteristics of said first signal;

second signal means responsive to said third signal for genrating a fourth signal when said first signal reaches a selected value;

third and fourth signal means respectively responsive to first and second conditions of said second signal for generating fifth and sixth signals respectively representing first and second conditions of the wheel speed of the vehicle;

buffer circuit means for eliminating undesirable characteristics of said second signal to provide a seventh signal which is coupled to said fourth signal means;

said first signal means comprising a differential amplifier having first and second transistors with commonly connected emitter regions, said first transistor having a base region coupled to said first varying DC signal and said second transistor having a base region coupled to an input signal having a magnitude of said selected value, and said common emitter regions being coupled to circuit ground and to said buffer circuit means.

2. The DC Level Detector and Zero Velocity Gate circuit of claim 1 wherein the collector region of said second transistor is coupled to said second signal means.

3. The DC Level Detector and Zero Velocity Gate circuit of claim 2 wherein said buffer circuit means includes a third transistor having a base region coupled to said common emitter regions of said first and second transistors.

4. The Dc Level Detector and Zero Velocity Gate circuit of claim 3 wherein said second signal means includes a fourth transistor having a base region connected to said collector region of said second transistor.

5. The DC Level Detector and Zero Velocity Gate circuit of claim 4 wherein the collector region of said third transistor is connected to circuit ground and the emitter region of said third transistor provides said seventh signal.

6. The DC Level Detector and Zero Velocity Gate circuit of claim 5 wherein the collector region of said fourth transistor is coupled to circuit ground and provides said fourth signal.

7. In a vehicle skid control braking system of the type that selectively controls the engagement and disengagement of the braking system of a vehicle in accordance with selected braking conditions, a DC level detector and zero velocity gate circuit comprising in combination:

first signal means responsive to a first signal in the form of a varying DC signal representing the wheel speed of the vehicle for generating second and third signals proportional to said first signal, said first signal means including detector means for eliminating undesirable ripple characteristics of said first signal;

second signal means responsive to said third signal for generating a fourth signal in the form of a gate signal indicating the condition when said first signal reaches a selected value representative of a predetermined minimum wheel speed;

third and fourth signal means respectively responsive to first and second conditions of said second signal for generating fifth and sixth signals respectively representing first and second conditions of the wheel speed of the vehicle, said fifth signal representing acceleration conditions of the wheels of the vehicle and said sixth signal representing deceleration conditions of the wheels of the vehicle;

buffer circuit means for eliminating undesirable characteristics of said second signal to provide a seventh signal which is coupled to said fourth signal means; and said first signal means comprising a differential amplifier having first and second transistors with commonly connected emitter regions.

8. The DC Level Detector and Zero Velocity Gate circuit of claim 7 wherein said first transistor has a base region coupled to said first varying DC signal and said second transistor has a base region coupled to an input signal having a magnitude of said selected value.

* * * * *